US012311629B2

(12) United States Patent
Weissbach et al.

(10) Patent No.: US 12,311,629 B2
(45) Date of Patent: May 27, 2025

(54) DEVICE FOR SUPPORTING A CONSTITUENT PART OF A TABLETING MACHINE, USE THEREOF, AND METHOD FOR ADJUSTING A POSITION OF A CONSTITUENT PART OF A TABLETING MACHINE

(71) Applicant: KORSCH AG, Berlin (DE)

(72) Inventors: Thomas Weissbach, Berlin (DE); Ahmet Cetintas, Berlin (DE); Stephan Mies, Berlin (DE)

(73) Assignee: Korsch AG, Berlin (DE)

( * ) Notice: Subject to any disclaimer, the term of this patent is extended or adjusted under 35 U.S.C. 154(b) by 404 days.

(21) Appl. No.: 17/641,527

(22) PCT Filed: Sep. 9, 2020

(86) PCT No.: PCT/EP2020/075160
§ 371 (c)(1),
(2) Date: Mar. 9, 2022

(87) PCT Pub. No.: WO2021/048180
PCT Pub. Date: Mar. 18, 2021

(65) Prior Publication Data

US 2022/0332078 A1 Oct. 20, 2022

(30) Foreign Application Priority Data

Sep. 9, 2019 (EP) .................................... 19196101

(51) Int. Cl.
*B30B 15/30* (2006.01)
*B30B 11/08* (2006.01)

(52) U.S. Cl.
CPC ............. *B30B 15/304* (2013.01); *B30B 11/08* (2013.01)

(58) Field of Classification Search
CPC ........ B30B 15/302; B30B 15/00; B30B 11/08
See application file for complete search history.

(56) References Cited

U.S. PATENT DOCUMENTS 650,644 A 5/1900 Koeppen
6,068,465 A * 5/2000 Wilson ................. B30B 15/304 425/193

FOREIGN PATENT DOCUMENTS

CN 201645875 U * 11/2010
CN 205364626 U 7/2016
DE 4133761 A1 4/1993

OTHER PUBLICATIONS

International Search Report and Written Opinion of counterpart PCT Application PCT/EP2020/075160 dated Nov. 26, 2020.

* cited by examiner

*Primary Examiner* — Seyed Masoud Malekzadeh
*Assistant Examiner* — Xinwen Ye
(74) *Attorney, Agent, or Firm* — Chambliss, Bahner & Stophel, P.C.; Stephen D. Adams

(57) ABSTRACT

In a first aspect, the invention relates to an apparatus for supporting a component of a tableting machine, the apparatus comprising as components an upper part, an intermediate element and a lower part. In further aspects, the invention relates to a tableting machine comprising a described apparatus and a method or use of the apparatus for adjusting a position of a component of a tableting machine. By means of the proposed apparatus, in particular the feeder support of a tableting machine and thus preferably the position of the filling device above the die table can be easily, quickly and reproducibly adjusted, preferably during machine set-up, but also during operation of the rotary tableting machine, in such a way that material loss is minimized.

13 Claims, 2 Drawing Sheets

DEVICE FOR SUPPORTING A CONSTITUENT PART OF A TABLETING MACHINE, USE THEREOF, AND METHOD FOR ADJUSTING A POSITION OF A CONSTITUENT PART OF A TABLETING MACHINE

TECHNICAL FIELD

In a first aspect, the invention relates to an apparatus for supporting a component of a tableting machine, the apparatus comprising as components an upper part, an intermediate element and a lower part. In further aspects, the invention relates to a tableting machine comprising a described apparatus and a method or use of the apparatus for adjusting a position of a component of a tableting machine. By means of the proposed apparatus, in particular the feeder support of a tableting machine and thus preferably the position of the filling device above the die table can be easily, quickly and reproducibly adjusted, preferably during machine set-up, but also during operation of the rotary tableting machine, in such a way as to minimize material loss.

BACKGROUND

It is known in the prior art that pellets or tablets can be produced with tableting machines which are designed, for example, as rotary tableting machines. In a rotary tableting machine, the tablets are produced in the openings or bore holes of a die table by compressing tableting material, of which the tablet is later to consist, between an upper punch and a lower punch to form a pellet. The tableting material is compressed into pellets in openings and/or bore holes of the die table, wherein the die table may be part of a rotating turret. It is preferred in the sense of the invention that the turret rotates about a turret axis, wherein the turret axis is preferably formed perpendicular to a preferably flat turret surface and/or turret underside and the turret axis is preferably arranged centrally within the turret.

In order to fill the tableting material into the openings and/or bore holes, filling devices are used, whereby in the state of the art, for example, so-called gravity feeders or motor-driven filling devices are described. Gravity feeders are characterized in that the tableting material enters the area of the die table due to gravity. For this purpose, for example, an outlet tube can be used, whereby the outlet of the tableting material can be controlled and/or limited, for example, by means of a slide valve or a rotary valve. The use of gravity feeders is particularly advantageous when tableting material with good flow and filling properties is to be compressed into pellets and/or tablets.

In motor-driven feeding devices, for example, feeding wheels can be arranged to transport the tableting material to the die sockets. In this way, a good filling result can be achieved even for poorly flowing pressing material. The filling devices known from the prior art can, for example, be mounted within the tableting machine by means of a metal frame and/or a feeder support. Depending on the specific mounting method, the feeder support can preferably also be referred to as a feeder support, although the terms "feeder support" and "feeder plate" are preferably used as a generic term for both terms in the context of the invention. Typically, the feeder support is adjusted relative to the die table of the turret of the tableting machine such that the feeder plate is aligned plane-parallel to the die table and is situated at a distance from the die table. This distance can be in the range of 0.1-0.3 mm, for example. In particular, the filling device is also situated higher than the die table of the rotary tableting machine by this amount of 0.1-0.3 mm. This distance can be adjusted by adjusting means and/or adjusting elements, it being a particular concern of the present invention to simplify and optimize the setting and/or adjustment of the feeder support and/or the filling device, the previous setting and/or adjustment being very time-consuming and labor-intensive due to the installation of conventional filling devices in tableting machines. In particular, proper adjustment of the feeder plate requires a great deal of experience, patience and manual precision on the part of the operator.

Both the frame of the gravity filling device and the housing of the motor-driven filling device can be fastened to the feeder support, the bracket of which is preferably mounted unmovably relative to the rotating turret of the rotary tableting machine on the machine housing or the machine base. When mounted, the underside of the filling devices must never touch the rotating die table, otherwise the die table and/or the feeder plate could be damaged. If the filling devices are mounted on the feeder support, the underside of the filling device must preferably be aligned plane-parallel to the die table and also be situated at a uniform distance from the die table of, for example, 0.1-0.3 mm.

The feeder support can, for example, be connected to the tableting machine by means of clamping and/or adjusting screws, tableting machine realizing the connection by means of an adjusting plate of a bracket, for example of the metal frame. In addition, adjusting elements such as spindles, screws and/or lock nuts can be used. A disadvantage of the use of such conventional adjusting elements in the context of the arrangement and fastening of the filling device within the tableting machine is that these conventional adjusting elements may mutually influence each other in their effect. In other words, the setting and/or adjustment of the feeder support is not simple and is also very time-consuming, since when the position of one adjusting element is adjusted, the positions of the other adjusting elements are often also automatically adjusted. In particular, the adjusting elements provide for adjustments of the feeder support and/or the filling device in different spatial directions, these directions preferably being referred to as parameters in the sense of the invention.

It can happen that a feeder support has an optimum setting and/or adjustment in all but one parameter. If then one of the mutually influencing adjustment elements is adjusted in order to optimize the setting of the feeder support and make it more favorable for all parameters, it can happen that the setting for the other parameters is thereby worsened and in total and in the overall view of all parameters a worse result is obtained than was previously the case. It is an objective of the present invention to avoid the occurrence of such situations.

A further concern of the present invention is to enable an optimization of the feeder position relative to the die table, in particular while the tableting machine is running. Within the meaning of the invention, the term "feeder position" preferably comprises the adjustment and/or fastening of the feeder support and/or the filling device. By being able to adjust the feeder support and/or the filling device while the tableting machine is running, it is furthermore advantageously possible to minimize the amount of material loss which necessarily occurs during an adjustment or readjustment. The extent of material loss can be visually verified, for example, by performing a visual inspection of the surface of the die table. If this appears shiny like a mirror and, in particular, no powder and no material streaks can be seen on the die table, then the feeder plate is very well adjusted or there is an optimum distance between the underside of the filling device and the die table. This means in particular that the feeder plate is situated at a uniformly short distance from the rotating die table. Adjustability of the feeder position relative to the die table during operation of the tableting machine cannot be achieved by conventional fastening of the filling device or the feeder support with the aforementioned adjustment elements.

It would therefore be desirable to be able to provide an apparatus which eliminates the above-mentioned disadvantages and permits, with little design effort, an easily manageable and precise adjustment of the feeder plate relative to the die table. In the known prior art, there have not been any adequate solutions to this so far:

DE 41 33 761 A1 proposes a bracket for the spatial alignment of an object and comprises a lower receiving block, a central swivel plate and an upper retaining plate. The contact surfaces between the swivel plate and the retaining plate are preferably each designed as sections of a cylinder barrel with respect to two right-angled axes. By loosening or tightening mirror-symmetrical adjusting screws, tilting or swiveling movement shall be enabled in orders of magnitude of 1/100 mm about the respective axes. Use of the bracket for aligning components of a tablet press is not disclosed.

U.S. Pat. No. 650,644 A discloses a swiveling or tilting bracket in a machine vice. For this purpose, an attachment on a work bench is proposed with a lower plate and concave or convex segments lying on top of each other. The angle of inclination can be adjusted by means of a screw with a spiral thread. CN 205 364 626 U also does not describe the use of the bracket for aligning components of a tablet press.

CN 201 645 875 U describes a cleaning device for smaller tablet presses with a cutter head whose outer diameter is matched to the die sockets to be cleaned. The cutter head is attached to a guide rod, which is connected to a handle via a universal joint. The joint is a cardan joint. A component of the tablet press to be cleaned itself is not aligned by the joint.

CN 201 645 875 U discloses a three-point fine adjustment for a filling device in a rotary tableting machine, which is intended to enable more precise alignment of a lower surface of the filling device with the die table. For this purpose, a retaining frame is proposed which is supported on three support columns. Each of the support columns has fine adjustments and convex or concave spherical surfaces at the upper end. During installation, the filling device with its base plate is placed on the three support columns. This is to realize a 3-point fine adjustment, which allows an adjustment of the inclination and height angle in relation to the die table. A disadvantage is increased design complexity and the necessary adjustment of three separate support columns.

It is therefore the objective of the present invention to provide an apparatus which does not have the disadvantages and shortcomings of the prior art. In particular, one objective of the invention is to simplify the setting and/or adjustment of the feeder support and/or the filling device. A further objective of the invention is to enable the feeder support and/or the filling device to be readjusted and/or adjusted while the tableting machine is in operation, to minimize material loss when adjusting the distance between the die table and the filling device, and to provide a means of visually checking the functioning and/or quality of the feeder position.

DESCRIPTION OF THE INVENTION

The objective is solved by the features of the independent claims.

Advantageous embodiments of the invention are described in the dependent claims. According to the invention, an apparatus for supporting a component of a tableting machine is provided, said apparatus comprising as components an upper part, an intermediate element and a lower part. The apparatus is characterized in that the upper part, the intermediate element and the lower part are arranged one above the other, and the mutually contacting surfaces of the components are each formed to correspond to one another, so that the upper part and the intermediate element are formed to be slidable relative to one another in a first spatial direction, and the intermediate element and lower part are formed to be slidable relative to one another in a second spatial direction. In this case, the spatial directions are defined by or preferably coincide with two swivel axes lying essentially perpendicular to one another in a plane.

It is particularly preferred within the meaning of the invention that the component of the tableting machine is a feeder support, a feeder plate and/or a filling device. In the following, therefore, reference will predominantly be made to a feeder plate or a filling device. However, it is equally preferred that components of a tableting machine other than these can be fixed by the proposed apparatus. It is preferred in the sense of the invention that the apparatus is adapted to support and/or receive the component of the tableting machine. It may also be preferred in the sense of the invention that the component is attached to the tableting machine by the apparatus, or that the proposed apparatus forms a bearing apparatus for the component of the tableting machine. Preferably, the apparatus may also be considered as a retaining apparatus for a tableting machine component, the apparatus preferably being adapted to set and/or adjust the position and/or orientation of the tableting machine component in space. This capability results in particular from the proposed structure of the apparatus and the arrangement of the components of the apparatus to be slidable with respect to each other, allowing the components to be moved with respect to each other in two different spatial directions, which is ensured in particular by the corresponding shaping of the surfaces of the components facing each other. The tableting machine may particularly preferably be a rotary tableting machine.

In a particularly preferred aspect, therefore, the invention relates to a tableting machine comprising a turret, a die table having die sockets, a filling device for filling the die sockets, and an apparatus for supporting the filling device, wherein the apparatus comprises as components an upper part, an intermediate element and a lower part, wherein the upper part, the intermediate element and the lower part are arranged one above the other, and the mutually contacting surfaces of the components are each formed in a corresponding manner so that the upper part and the intermediate element are formed to be slidable relative to one another in a first spatial direction and the intermediate element and lower part are formed to be slidable relative to one another in a second spatial direction, and wherein the filling device is installed on a feeder support which is mounted on the upper part of the apparatus and permits setting and/or adjustment of the feeder support relative to the die table.

It may be particularly preferred within the meaning of the invention that the proposed apparatus achieves a mounting of the feeder plate and/or the filling device in two intersecting swivel axes, the swivel axes preferably being formed substantially perpendicular to each other. In particular, it may be preferred in the sense of the invention that a center of gravity of the component of the tableting machine is preferably located below the intersection of the swivel axes. This preferably results in the component of the tableting machine not following the incline of its surroundings. It was completely surprising that the proposed apparatus can provide an apparatus with which the adjustment can be substantially facilitated and with which an adjustment of the feeder position relative to the die table can be made, in particular while the tableting machine is running.

It is preferred in the sense of the invention that the upper part of the apparatus has a surface and a cylindrical lower surface, wherein the upper surface of the upper part is in particular flat. A flat upper surface is preferably characterized within the meaning of the invention in that the flat upper surface is suitable for supporting and/or receiving a plate-shaped object.

For example, the flat upper surface of the upper part of the proposed apparatus can preferably be used for the feeder plate to be placed thereon. Furthermore, the person skilled in the art knows how a flat upper surface is obtained. It is preferred within the meaning of the invention to use the terms "upper side" and "upper surface" synonymously. It is further preferred within the meaning of the invention that the upper part has a cylindrical lower surface. Within the meaning of the invention, this preferably means that the lower region of the upper part of the apparatus is formed like a partial region of a round cylinder. In this case, the lower surface is preferably formed by a curved outer wall. Furthermore, the lower outer edges of the upper part can be circular arc-shaped or represent a section of a circle. In other words, the lower surface of the upper part of the apparatus is formed in a crescent shape. This implies that there is an outward curvature of the preferably cylindrically shaped lower surface, wherein an "outward curvature" within the meaning of the invention is preferably referred to as a "convex" configuration of the lower surface.

It is within the meaning of the invention that a virtual swivel axis can be derived from the cylindrically formed lower surface of the upper part of the apparatus. This swivel axis can preferably coincide with the first spatial direction in which the upper part and the intermediate element of the apparatus can be formed to be slidable relative to one another. Within the meaning of the invention, this preferably means that the upper part of the apparatus is formed such that it can move about this swivel axis, the swivel axis preferably representing an axis of rotation of this movement.

This movement of the upper part of the proposed apparatus is preferably referred to within the meaning of the invention as movement "in a first spatial direction". In a preferred embodiment of the invention, the swivel axis can be derived from the partial cylindrical shape of the upper part if, for example, a virtual central axis is placed through the partial cylinder completed to form the complete cylinder. In particular, it is preferred that this virtual swivel axis can be derived from the preferably partially circular arc-shaped outer edge of the lower surface of the upper part of the apparatus or from the preferably cylindrical outer wall of the upper part. It is preferred within the meaning of the invention if this swivel axis, which is determined for example by the shape of the lower surface of the upper part of the apparatus, is associated with a y-axis and/or this swivel axis coincides with the first spatial direction.

It is preferred that this movement of the upper part is assisted by the shape of the upper surface of the intermediate element, the intermediate element preferably having a cylindrical upper surface which is particularly adapted to receive the lower surface of the upper part of the proposed apparatus. This capability is described within the meaning of the invention such that the upper surface of the intermediate element and the lower surface of the upper part are formed to correspond to each other.

It is particularly preferred within the meaning of the invention that the shape of the lower surface of the upper part corresponds to a shape of the upper surface of the intermediate element. Advantageously, this makes it possible for the upper part and the intermediate element to be formed so as to be slidable relative to one another in a first spatial direction. In the context of the present invention, the intermediate element preferably has an inwardly curved upper surface, which is preferably referred to as a "concave" upper surface or curvature within the meaning of the invention, wherein the preferred correspondence between the upper surface of the intermediate element and the lower surface of the upper part is preferably achieved by the concave configuration of the upper surface of the intermediate element and the corresponding convex configuration of the lower surface of the upper part.

It is further preferred within the meaning of the invention that the upper surface of the intermediate element and the lower surface of the upper part are formed similarly to the components of a ball-and-socket joint with respect to each other, whereby in this analogy the intermediate element represents the joint socket and the upper part represents the joint head, whereby the upper part is preferably arranged to move in the cavity of the intermediate element, in particular to rotate therein. In particular, it is preferred within the meaning of the present invention that the swivel axes are located in the die table plane. Most preferably, one of the swivel axes intersects the turret axis.

It is further preferred that the intermediate element has a cylindrical upper surface and a cylindrical lower surface. It is particularly preferred that the upper surface of the intermediate element is concave and the lower surface of the intermediate element is convex. In this respect, it is in particular preferred that the curvatures do not extend at equal distances from one another and reflect, for example, the shape of uniformly catenary railroad tracks, but it is much more preferred within the meaning of the invention that the respective lowest points of the preferably concavely formed upper surface and the preferably convexly formed lower surface are arranged rotated by substantially 90° with respect to one another. If the preferably concave upper surface and the preferably convex lower surface of the intermediate element were theoretically supplemented to form round cylinders, the central axes running centrally through the two cylinders would preferably be perpendicular to one another and lie in a spatial plane.

It is preferred within the meaning of the invention that the shape of the lower surface of the intermediate element corresponds to a shape of the upper surface of the lower part. Thereby it is achieved that the intermediate element and the lower part are formed to be slidable relative to each other, wherein the movement relative to each other preferably represents a rotational movement, which within the meaning of the invention is preferably a rotation in a second spatial direction, which preferably coincides with an x-axis of the apparatus. Preferably, the x-axis and y-axis are substantially perpendicular to each other, the x-axis and y-axis preferably lying in a plane that is, for example, parallel to and/or identical to the die table plane of the tableting machine. It is preferred within the meaning of the invention that this x-axis represents a swivel axis for the movement of the intermediate element in the lower part of the apparatus, wherein the swivel axis or its arrangement in space can preferably be derived from the preferably circular shape of the upper surface of the lower part of the apparatus. For example, the swivel axis can be thought of as a virtual central axis through the partial cylinder completed to the complete cylinder, which is formed by the lower surface of the intermediate element and which preferably corresponds to the upper surface of the lower part of the apparatus.

It is preferred within the meaning of the invention that the axes of the cylinders constitute a substantially right angle with each other in a first spatial direction and in a second spatial direction. Preferably, within the meaning of the invention, the swivel axes are also referred to as “axes of the cylinder surfaces”, “axes of rotation” or “cylinder axes”. It is preferred within the meaning of the invention that the apparatus enables swiveling of a component of a tableting machine, preferably about the swivel axes.

Preferably, these swivel axes are virtual swivel axes, the term “virtual swivel axis” within the meaning of the invention preferably being understood to mean that the swivel axes are not necessarily present objectively or designed to be visible and/or touchable. Preferably, the invention comprises at least one preferably virtual swivel axis, although in the context of the invention the presence of two or three swivel axes may also be preferred. Most preferably, two swivel axes are present.

It is particularly preferred within the meaning of the invention that by rotation of the components of the apparatus the component of the tableting machine to be swiveled and/or adjusted can be brought into an advantageous position, preferably irrespective of whether at this position other components or other obstacles stand in the way of the attachment of an actually present “axis”—for example in the form of a further component of the tableting machine. This is particularly preferred if the component of the tableting machine to be swiveled and/or adjusted is formed by a support for filling devices. It is particularly preferred within the meaning of the invention to place the swivel axes in the die table plane, in particular in such a way that one of the swivel axes intersects the turret axis. In the sense of the invention, this preferably means that the swivel axis intersecting the turret axis is preferably arranged radially to the turret, whereas another swivel axis may preferably be arranged perpendicularly thereto and approximately tangentially to a reference circle of the die table.

In a preferred embodiment of the invention, the surfaces of the upper part, the intermediate element and the lower part that are in contact with each other are designed to correspond to each other in such a way that the swivelable upper part can be assigned a swivel axis that corresponds to a first spatial direction and the intermediate element can be swiveled about a swivel axis that corresponds to the second spatial direction. Such swivel axes can be ensured, for example, as described above by corresponding cylindrical upper and lower surfaces of the components.

In this way, it is advantageously possible to adjust an inclination of the feeder support, whereby an inclination can be adjusted in particular by a radial and/or a tangential axis, preferably relative to the turret. In particular, the capacity for adjustment of the inclination of the feeder support can be achieved without influencing the respective other parameters and without simultaneously initiating an undesired translatory movement. Through the preferred attachment of adjustment elements, such as spindles and/or scaling means, the adjustment can preferably be made parameter by parameter, precisely, purposefully and reproducibly. Furthermore, it may be preferred within the meaning of the invention to use high-precision displacement measuring systems and/or motorized drive means in order to further optimize, automate and, in particular, simplify the adjustment of the inclination parameters.

In the context of the invention, it is particularly preferred to use closed components, so that the proposed apparatus can be particularly well integrated into an overall GMP-compliant solution.

Thus, it is particularly preferred that the invention relates to an apparatus for supporting a feeder and/or filling device, said apparatus comprising an upper part, a lower part and an intermediate element, said upper part having a flat surface and a cylindrical lower surface and said intermediate element having a cylindrical upper surface and a cylindrical lower surface, the axes of said cylinders lying in a first spatial direction and in a second spatial direction relative to each other, wherein the spatial directions include a substantially right angle with each other, wherein the shape of the lower surface of the upper part corresponds to a shape of the upper surface of the intermediate element, and the upper part and the intermediate element are slidably arranged with respect to each other in a first spatial direction, and wherein the shape of the lower surface of the intermediate element corresponds to a shape of the upper surface of the lower part, and the intermediate element and the lower part are slidably arranged with respect to each other in a second spatial direction.

It is particularly preferred within the meaning of the invention that the upper surface of the lower part and the lower surface of the intermediate element are formed similarly to the components of a ball and socket joint with respect to each other, whereby in this analogy the lower part represents the joint socket and the intermediate element represents the joint head, and the intermediate element is adapted to move, in particular to rotate, in a cavity of the lower part, which is preferably formed by the concave upper surface of the lower part.

In this case, the components of the apparatuses are advantageously preferably simultaneously positively secured against undesired lifting. Preferably, the axes of the cylinder surfaces are arranged substantially perpendicular to each other and in a spatial plane. It is preferred within the meaning of the invention that the axes of the cylinder surfaces form virtual swivel axes of the apparatus, whereby in a preferred embodiment of the invention the apparatus can assume the functionality of a joint and/or a tilting device. It is preferred within the meaning of the invention that the apparatus can be variably designed and flexibly adapted to different needs by a suitable choice and arrangement of the cylinder axes and/or the cylinder radii.

In a preferred embodiment of the invention, the apparatus comprises adjusting elements, such as adjusting spindles and/or scaling means. Advantageously, this can improve the operability and reproducibility of the setting and/or adjustment of the component of the tableting machine to be adjusted. The scaling means can, for example, be arranged on the side surfaces of the components of the apparatus, whereby they can preferably be height scales with an indication in the millimeter or micrometer range or an angle scale with an indication in the angle or sub-angle range.

The adjustment spindles can be, for example, threaded spindles or fine-thread spindles with which, advantageously, particularly fine adjustments can be achieved and/or set. The spindles can be adjusted manually, for example. However, the adjustment can also be carried out with the aid of adjustment wheels with integrated position indicator and/or in a motorized manner.

In a further embodiment of the invention, it is preferred that the apparatus comprises belleville springs. Preferably, the disc springs may be in the form of belleville spring packages. Preferably, the belleville springs serve to eliminate and/or reduce play between components of the apparatus and/or components of the tableting machine. In particular, it is preferred within the meaning of the invention that the belleville springs are arranged to permanently place the apparatus under a preload. It is particularly preferred within the meaning of the invention that the play between the three components of the proposed apparatus, namely upper part, lower parts and intermediate element, is eliminated by preferably two packages of belleville springs.

It is further preferred that the apparatus comprises clamping elements. The provision of clamping elements is advantageous in order to enable subsequent clamping of the apparatus and/or its components. It is preferred within the meaning of the invention that the apparatus comprises at least one clamping element, the clamping elements preferably also being referred to as clamping devices within the meaning of the invention. In particular, it is preferred if the clamping devices are arranged substantially perpendicular to the apparatus and/or the adjusting elements in order to particularly effectively avoid a subsequent adjustment of the position during clamping.

The apparatus can further comprise a height adjustment of the bottom of the filling device relative to the die table, which can be present, for example, in a retaining column of the proposed apparatus. The height adjustment may in particular be in the form of a mechanical height adjustment. It is preferred in the sense of the invention that the height adjustment can be used to adjust a distance, in particular a height distance, of the underside of the feeder plate from the surface of the die table.

Preferably, the proposed apparatus enables components, i.e. components of a tableting machine, to be swiveled about defined "virtual axes". In the sense of the invention, this means in particular that the swiveling axes themselves do not have to be represented by components, but the swiveling axes can preferably be present in an almost arbitrary position outside the apparatus. It is also preferred within the meaning of the invention that the swivel axes are "located" in another component of the tableting machine, without there actually having to be "axes" present there—in the form of components. In this way, the proposed apparatus advantageously makes it possible to set a horizontal inclination of a support and preferably to define two unambiguous, fixed and mutually perpendicular swivel axes at the height of the die table.

In particular, an apparatus is provided with which the inclination of the component of the tableting machine, which is supported and/or received up by the apparatus, can be changed successively about defined axes without having to influence the other parameters in each case and without simultaneously causing a displacement of the component of the tableting machine. For the purposes of the invention, a displacement is preferably also referred to as a translational movement. In particular, the proposed invention is particularly effective in avoiding the undesired "wobbling" movement of the feeder support, which is often problematic with conventional retainers for feeder supports, which usually operate with a three-point support, adjustment and clamping, especially when an adjustment of the feeder plate is made at one point. This disadvantage may be due to the fact that, in these conventional systems, the respective swivel axis is not in the plane in which the feeder plate is to be swiveled. The present invention provides a remedy in particular in that the swivel axes advantageously each maintain their point of intersection during adjustment, which is done in particular independently of the two swivel angles and/or their position in space. Thus, when adjusting one or the other parameter, there is no undesired "wobbling" of the feeder support or other machine parts.

The invention is described below with reference to an example of an embodiment: The proposed apparatus is based on components which are designed to slide with respect to each other on cylindrical contact surfaces. Thereby, the components are preferably simultaneously positively secured against lifting. The axes of the cylindrical surfaces can expediently be arranged perpendicular to one another in a plane. The axes of the cylinder surfaces preferably form "virtual" swivel axes of the apparatus. By the choice and arrangement of the cylinder axes and radii, the swivel geometry of the apparatus can be variably designed and adapted to various structural requirements within the tableting machine.

The proposed apparatus can be mounted in a tableting machine with the lower part on a holding column, whereby a manual or motorized height adjustment can be integrated within the holding column. The proposed apparatus and the retaining column can be arranged on the support plate of the tableting machine, this unit preferably serving to hold the feeder support on which a filling device can be fixed. By means of the proposed apparatus, the filling device mounted on the feeder support can be adjusted radially and axially to the surface of the die table in a simple and reproducible manner. The desired height distance of the underside of the feeder plate to the surface of the die table is finely adjusted manually or by motor with the height adjustment integrated in the feeder support.

In a tableting machine for the production of tablets and other pellets, the pressing material is filled into the bore holes of the press dies with the aid of a filling device, which is preferably located above the die table. The filling device is preferably located plane-parallel to the die table at a variable short distance above the die table. This position of the filling device preferably results from the setting and/or adjustment of the feeder support on which the filling device is mounted. The feeder support is mounted on the proposed apparatus. Preferably, this apparatus has two swivel axes in the x- and y-directions, which may be substantially perpendicular to each other. It may further be preferred that the upper swivel plane is used to align the fixture about the x-axis, preferably radially with respect to the die table. Furthermore, it may be preferred that the lower swivel plane aligns the proposed apparatus about the y-axis, preferably tangentially to the die table. It is further preferred within the meaning of the invention that the adjustment about the swivel axes is performed manually with adjustment spindles, wherein a scale may be provided for reproducible adjustment. It may be further preferred that handwheels with integrated scales are also used for the adjustment and/or that the adjustment can be motorized. Preferably, the position can be secured after the adjustment with a clamping device, whereby the clamping device within the meaning of the invention can preferably also be referred to as a clamping apparatus or clamping element. Preferably, the apparatus may be mounted on a support column, wherein a sensitive manual height adjustment may be integrated in the support column. It is particularly preferred within the meaning of the invention that the height adjustment is motorized.

It was completely surprising that the proposed apparatus can be used to swivel tableting machine components around defined "virtual" axes—i.e. axes that are not necessarily present in the machine. The present invention thus deliberately departs from prior art apparatuses in which the adjustment of the inclinations of a feeder support in a tableting machine has so far been accomplished by at least three vertically arranged adjustment elements. These can be, for example, spindles, screws and lock nuts. These adjustment elements can, disadvantageously, each influence the other in their effect, i.e. each element does not serve exclusively to set a parameter assigned to it, but rather the adjustment elements can, for example, influence several or all degrees of freedom of the tableting machine component to be swiveled and/or adjusted.

Furthermore, the proposed apparatus surprisingly avoids an undesired translational movement of the tableting machine component. This can be caused by the fact that in conventional retaining and adjusting apparatuses known from the prior art, the swivel axes lie outside the die table plane, which can have the disadvantage that the swivel axes can shift in space depending on the respective actuated adjusting element. As a result, in addition to the desired rotational movement of the tableting machine component, a predominantly horizontal, undesired translational movement is also frequently generated, with the component frequently additionally being fixed and/or clamped in the same direction as the adjustment, so that the adjustment result is undesirably influenced subsequently by the subsequent fixing and/or clamping, as a result of which an adjustment or setting of the feeder plate or filling device once achieved can be lost again. This is advantageously achieved in particular by the swivel axes maintaining their respective intersection point during adjustment. By means of the proposed apparatus—preferably in conjunction with the height adjustment integrated in the retaining column—the feeder support of a tableting machine and thus preferably the position of the filling device above the die table can be easily, quickly and reproducibly adjusted, preferably during machine setup but also during operation of the rotary tableting machine, in such a way that material loss is minimized.

In another aspect, the invention relates to a tableting machine comprising a described apparatus for supporting or setting and adjusting a component of the tableting machine, particularly preferably a filling device and/or a feeder plate.

In preferred embodiments of the invention, the tableting machine is a rotary tableting machine. The claimed rotary tableting machine belongs to the class of rotary tableting machines as known in the prior art. In this case, the turret preferably has an upper and lower punch guide for receiving punches, so that during a rotary cycle, pulverized material is pressed into a pellet or tablet in the sockets of a die table under the interaction of upper and lower punches.

The apparatus provided according to the invention allows components of a rotary tableting machine to be positioned in a particularly precise and simple manner. This is of particular importance for components of the rotary tableting machine which, for example, are unmovably mounted on the machine housing or a carrier plate and must be aligned to the rotating die table.

The apparatus according to the invention is therefore particularly suitable for the simple and precise positioning of a feeder plate or a filling device.

In a preferred embodiment, the invention therefore relates to a tableting machine comprising a turret, a die table with die sockets, and a filling device for filling the die sockets, and wherein the filling device is installed on a feeder support and the tableting machine comprises a described apparatus, wherein the feeder support is mounted on the upper part of the apparatus and allows setting and/or adjustment of the feeder support in all axes relative to the die table.

In preferred embodiments, the apparatus is unmovably installed on a housing and/or a carrier plate of the tableting machine.

In preferred embodiments, the apparatus is arranged attached to a support column within the tableting machine, the support column preferably being present installed on a support plate.

In further aspects, the invention relates to a use of the proposed apparatus for adjusting a position of a component of a tableting machine, and to a method for adjusting a position of a component of a tableting machine. The method is characterized in that a retaining apparatus is provided for the component of the tableting machine, wherein mutually contacting surfaces of components of the apparatus are respectively arranged relative to each other such that the components are slidable relative to each other, wherein the spatial direction in which the first and second components can move relative to each other and the spatial direction in which the second and third components can move relative to each other are arranged substantially perpendicular to each other and lie in a plane. It is preferred within the meaning of the invention that a retaining apparatus corresponds to a proposed apparatus and that a first component of the retaining apparatus corresponds to the upper part, a second component corresponds to the intermediate element and a third component corresponds to the lower part of the apparatus.

The person skilled in the art will recognize that preferred embodiments, advantages, effects, and definitions disclosed in connection with the proposed apparatus apply equally to the use thereof and to the claimed method and tableting machine.

BRIEF DESCRIPTION OF THE DRAWING

The invention is described in more detail by the following figures; it shows.

DETAILED DESCRIPTION

Figure 1:
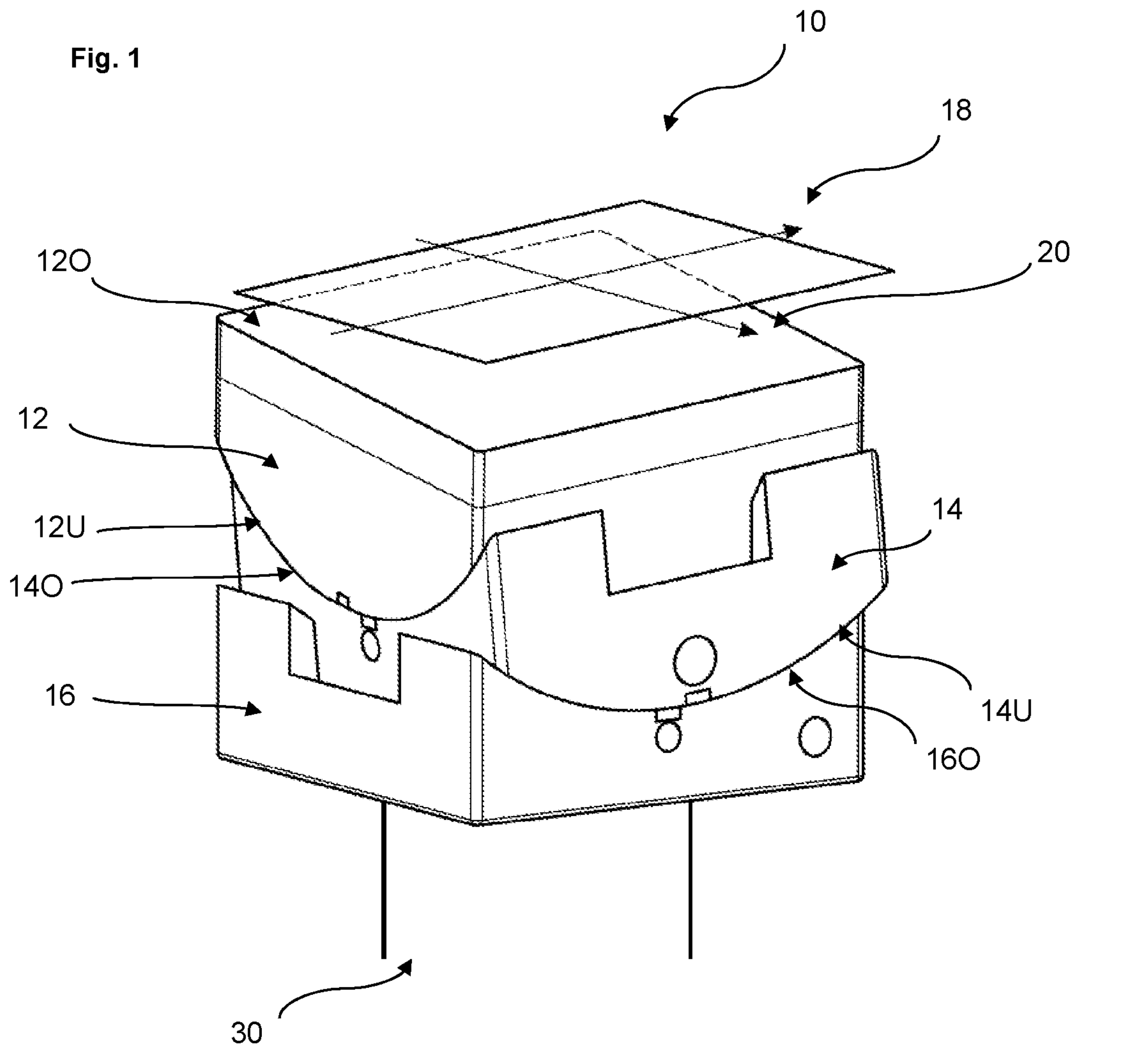
FIG. 1 View of a preferred embodiment of the invention with a retaining column FIG. 2 Sectional view through a preferred embodiment of the invention

FIG. 1 shows a view of a preferred embodiment of the apparatus (10) with a retaining column (30). In particular, the components (12, 14, 16) of the apparatus can be seen, namely the upper part (12), the intermediate element (14) and the lower part (16). In the preferred embodiment of the invention shown in FIG. 1, the upper part (12) has a flat upper surface (12O) on which a feeder support (not shown) can be placed. Furthermore, the upper part (12) has a lower surface (12U) which is cylindrical in shape. In particular, the lower surface (12U) of the upper part (12) is curved outwardly, this type of curvature being referred to within the meaning of the invention as a convex configuration of the lower surface (12U) of the upper part (12).

Also shown is the intermediate element (14), the upper surface (14O) of which corresponds to the lower surface (12U) of the upper part (12). The upper surface (14O) of the intermediate element (14) has an inward curvature, which within the meaning of the invention is referred to as a concave configuration of the surface. As can be seen from FIG. 1, the curvatures of the upper surface (14O) of the intermediate element (14) and the lower surface (12U) of the upper part (12) correspond to each other, which is referred to as "corresponding to each other" within the meaning of the invention. It is preferred within the meaning of the invention that the region between the upper part (12) and the intermediate element (14) of the apparatus (10) is referred to as the y-axis swiveling region, since a rotation of the upper part (12) in the curvature of the intermediate element (14) preferably takes place about a y-axis, the position of which is preferably defined by the cylindrical configuration of the upper surface (14O) of the intermediate element (14) and/or the lower surface (12U) of the upper part (12). Within the meaning of the invention, this y-axis is preferably also referred to as the swivel axis, wherein the movement of the upper part (12) in the curvature of the intermediate element (14) preferably takes place in a first spatial direction (18).

The lower surface (14U) of the intermediate element (14) is preferably also cylindrical in shape, in particular convex. The shape of the lower surface (14U) of the intermediate element (14) preferably corresponds to the shape of the upper surface (16O) of the lower part (16) of the apparatus (10), it being preferably meant within the meaning of the invention that the curvatures of the lower surface (14U) of the intermediate element (14) and of the upper surface (16O) of the lower part (16) correspond to one another and that the intermediate element (14) can move, in particular rotate, in a sliding manner in the curvature of the lower part (16). It is preferred within the meaning of the invention that the region between the intermediate element (14) of the apparatus (10) and the lower part (16) is referred to as the swivel region of the x-axis, since a rotation of the intermediate element (14) in the curvature of the lower part (16) preferably takes place about an x-axis, the position of which is preferably defined by the cylindrical configuration of the upper surface (16O) of the lower part (16) and/or the lower surface (14U) of the intermediate element (14). Within the meaning of the invention, this x-axis is preferably also referred to as the swivel axis, wherein the movement of the intermediate element (14) in the curvature of the lower part (16) preferably takes place in a second spatial direction (20).

Also shown in FIG. 1 is a support column (30) which, in a preferred embodiment of the invention, can comprise a height adjuster which can, for example, be integrated in the support column (30).

Figure 2:
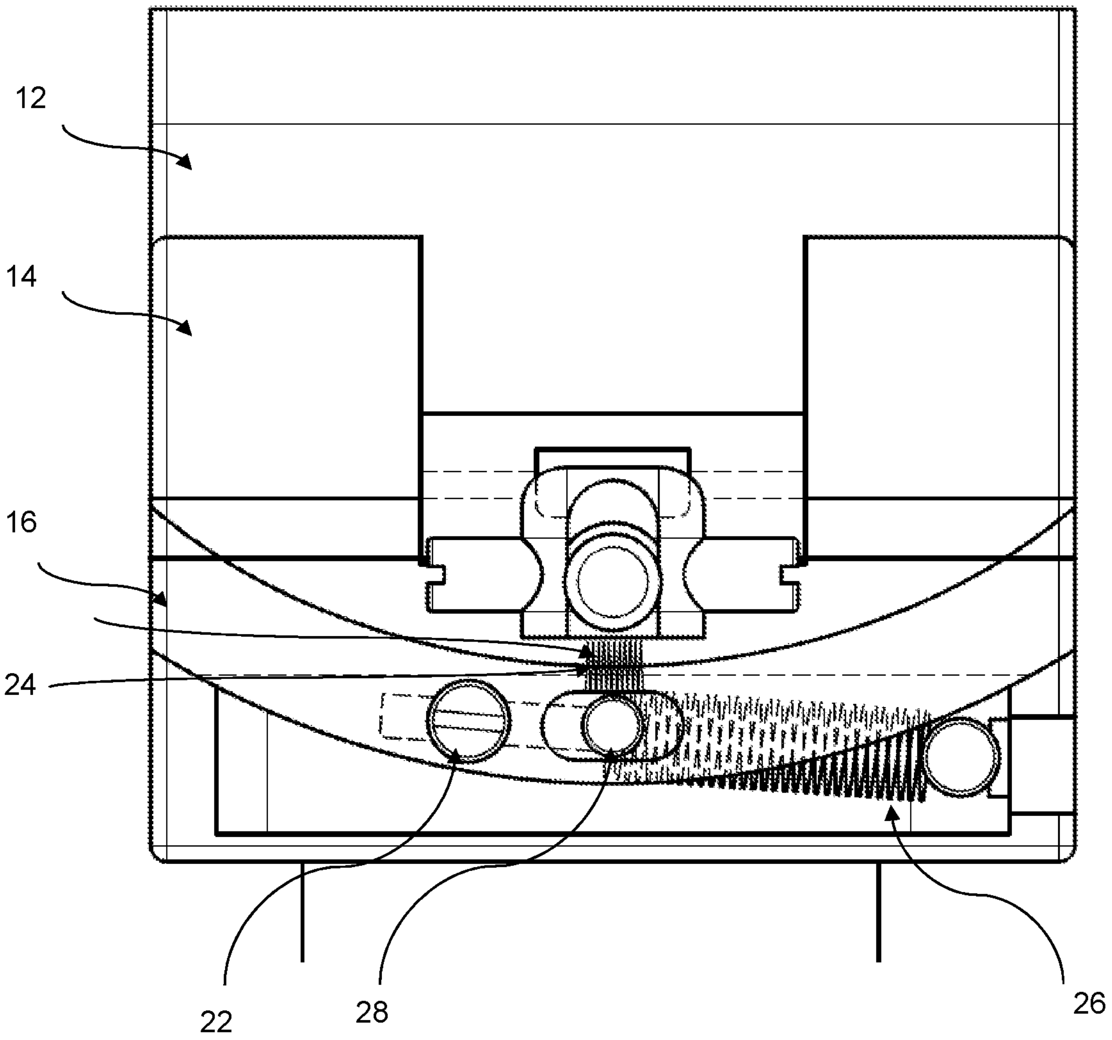

FIG. 2 shows a sectional view through a preferred embodiment of the apparatus (10) to illustrate further possible components of the apparatus. In particular, a scale (24), a belleville spring (26) and adjustment spindles (22) are shown, whereby an adjustment spindle (22) preferably represents a possible embodiment of an adjustment element within the meaning of the invention.

LIST OF REFERENCE SIGNS

10 Apparatus
12 Upper part
12 Upper surface of the upper part
12U Lower surface of the upper part
14 Intermediate element
14O Upper surface of the intermediate element
14U Lower surface of the intermediate element
16 Lower part
16O Upper surface of the lower part
18 First spatial direction
20 Second spatial direction
22 Adjustment spindle
24 Scale
26 Belleville spring
28 Clamping device
30 Support column

What is claimed is:

1. A tableting machine comprising an apparatus (10) for supporting a component of a tableting machine, the apparatus (10) comprising one upper part (12), one intermediate element (14) and one lower part (16), characterized in that the upper part (12), the intermediate element (14) and the lower part (16) are arranged one above another, and mutually contacting surfaces (12U, 140, 14U, 160) of the parts (12, 14, 16) are each formed to correspond, so that the upper part (12) and the intermediate element (14) are formed to be slidable relative to one another in a first spatial direction (18), and the intermediate element (14) and lower part (16) are formed to be slidable relative to one another in a second spatial direction (20), wherein the component of the tableting machine is mounted on the one upper part (12) and is fully supported by said apparatus, configured to allow for a one-point adjustment of an inclination of the component of the tableting machine by a relative sliding of the upper part (12) with respect to the intermediate element (14) and/or by the intermediate element (14) with respect to lower part (16).

2. The tableting machine of claim 1 wherein the component of the tableting machine is at least one of a feeder support or a filling device.

3. The tableting machine of claim 1 wherein the first spatial direction (18) and the second spatial direction (20) constitute a substantially right angle with each other.

4. The tableting machine of claim 1 wherein the mutually contacting surfaces (12U, 140, 14U, 16O) of the upper part (12), of the intermediate element (14) and of the lower part (16) are formed corresponding to one another in such a way that the upper part (12) can be swiveled about a swivel axis which corresponds to a first spatial direction (18) and the intermediate element (14) can be swiveled about a swivel axis which corresponds to the second spatial direction (20).

5. The tableting machine of claim 1 wherein the upper part (12) has a flat upper surface (12O) and at least one of a cylindrical lower surface (12U) or the intermediate element (14) has a cylindrical upper surface (14O) and a cylindrical lower surface (14U).

6. The tableting machine of claim 1 wherein a shape of the lower surface (12U) of the upper part (12) corresponds to a shape of the upper surface (14O) of the intermediate element (14).

7. The tableting machine of claim 1 wherein a shape of the lower surface (14U) of the intermediate element (14) corresponds to a shape of the upper surface (16O) of the lower part (16).

8. The tableting machine of claim 1 wherein the apparatus (10) comprises adjusting spindles (22) or scales (24).

9. The tableting machine of claim 1 wherein the apparatus (10) comprises at least one of belleville springs (26) or clamping elements (28).

10. The tableting machine of claim 1 wherein the tableting machine comprises a turret, a die table with die sockets, and a filling device for filling the die sockets, wherein the filling device is installed on a feeder support and wherein the feeder support is mounted on the upper part (12) of the apparatus (10) and allows at least one of adjustment or setting of the feeder support relative to the die table.

11. The tableting machine of claim 1 wherein the apparatus (10) is unmovably installed on at least one of a housing or a support plate of the tableting machine.

12. The tableting machine of claim 1 wherein the apparatus (10) is attached to a support column (30) within the tableting machine.

13. The tableting machine of claim 12, wherein the support column (30) is installed on a support plate.

* * * * *